(12) United States Patent
Wang

(10) Patent No.: US 12,149,586 B2
(45) Date of Patent: Nov. 19, 2024

(54) IMAGE DISTRIBUTION METHOD, ELECTRONIC DEVICE AND STORAGE MEDIUM

(71) Applicant: ZTE CORPORATION, Shenzhen (CN)

(72) Inventor: Danghua Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/003,972

(22) PCT Filed: Mar. 18, 2021

(86) PCT No.: PCT/CN2021/081632
§ 371 (c)(1),
(2) Date: Dec. 30, 2022

(87) PCT Pub. No.: WO2022/001203
PCT Pub. Date: Jan. 6, 2022

(65) Prior Publication Data
US 2023/0269295 A1    Aug. 24, 2023

(30) Foreign Application Priority Data
Jun. 30, 2020  (CN) .......................... 202010618603.3

(51) Int. Cl.
*H04L 67/1095* (2022.01)
*G06F 8/61* (2018.01)
(Continued)

(52) U.S. Cl.
CPC ............ *H04L 67/1095* (2013.01); *G06F 8/63* (2013.01); *G06F 9/45558* (2013.01); *G06F 16/16* (2019.01); *H04L 67/06* (2013.01)

(58) Field of Classification Search
CPC ........ G06F 8/63; G06F 9/45558; G06F 16/16; H04L 67/06; H04L 67/1095
See application file for complete search history.

(56) References Cited

U.S. PATENT DOCUMENTS

| 6,564,369 B1 | 5/2003 | Hove et al. |
| 11,288,377 B1 * | 3/2022 | Kopylov ............. G06F 9/45558 |

(Continued)

FOREIGN PATENT DOCUMENTS

| CN | 105740048 A | 7/2016 |
| CN | 106506587 A | 3/2017 |

(Continued)

OTHER PUBLICATIONS

International Search Report and Written Opinion issued in International Application No. PCT/CN2021/081632; mailed Jun. 9, 2021; 12 pgs.

(Continued)

*Primary Examiner* — Thomas J Dailey
(74) *Attorney, Agent, or Firm* — HAUPTMAN HAM, LLP

(57) ABSTRACT

Embodiments of the present application relate to the technical field of communications, and provide a distribution method, a server, and a storage medium. The distribution method includes: obtaining a distribution request of an image file; identifying a first storage location of each layer data of the image file in a source image repository; and distributing each layer data of the image file from the source image repository to the target image repository according to the first storage location. When the image distribution is required, the storage location of each layer data of the image file is identified and then the image distribution is performed. Therefore, the image file does not need to be pulled locally and then pushed to the target image repository.

9 Claims, 6 Drawing Sheets

(51) Int. Cl.
*G06F 9/455* (2018.01)
*G06F 16/16* (2019.01)
*H04L 67/06* (2022.01)

(56) References Cited

U.S. PATENT DOCUMENTS

| | | |
|---|---|---|
| 2008/0235266 A1 | 9/2008 | Huang et al. |
| 2020/0036772 A1 | 1/2020 | Xie |
| 2021/0255840 A1* | 8/2021 | Novy .................. G06F 8/63 |

FOREIGN PATENT DOCUMENTS

| | | |
|---|---|---|
| CN | 106776149 A | 5/2017 |
| CN | 107566195 A | 1/2018 |
| CN | 108322496 A | 7/2018 |
| JP | 2011123891 A | 6/2011 |
| JP | 2020095547 A | 6/2020 |

OTHER PUBLICATIONS

Notice of Reasons for Refusal issued in corresponding Japanese Patent Application No. 2022-581580; mailed Nov. 24, 2023; 10 pgs.
Decision of Refusal issued in Japanese Patent Application No. 2022-581580; mailed May 27, 2024; 7 pgs.
Communication of and extended European Search Report issued in European Patent Application No. 21833429.0; mailed Jun. 4, 2024; 8 pages.
Zheng, Chao et al; Wharf: Sharing Docker Images in a Distributed File System; SoCC'18, Oct. 11, 2018; 13 pgs.

* cited by examiner

IMAGE DISTRIBUTION METHOD, ELECTRONIC DEVICE AND STORAGE MEDIUM

CROSS-REFERENCE TO RELATED APPLICATIONS

This application is the national phase of International Application No. PCT/CN2021/081632, filed on Mar. 18, 2021, which claims priority to Chinese Patent Application No. 202010618603.3, filed on Jun. 30, 2020.

TECHNICAL FIELD

The embodiments of the present application relate to the technical field of communications, and in particular to an image distribution method, a server and a storage medium.

BACKGROUND

With the rapid development of IT technology, the virtualization technology with characteristics of convenience, simple in technology, low cost, and high security, is more and more widely used in the computer field. The image repository is an important network element in the virtualization technology, and is configured to store various image files of users. Images are stored in the image repository in layers, and different images are identified through different links. That is, an image is stored in the image repository not as a file but as a series of layers and links. This is a special file structure that enables each layer data to be shared and reduces the storage space.

During using the image, users often need to distribute images between multiple image repositories. In some cases, the image is distributed based on an open source application container engine, namely the docker system. First, pulling an image file from the source image repository. Then after tagging the image, pushing the image file to the target image repository corresponding to the new tag. In this way, a whole image file is pulled to the local to finish the image distribution, which occupies a higher network bandwidth and has a lower distribution efficiency. In addition, the image file often needs to be stored locally for a certain period of time, and when multiple distribution tasks correspond to a same image file, image file conflicts are prone to occur.

SUMMARY

The purpose of the embodiments in the present application is to provide an image distribution method, a server and a storage medium, so as to improve the efficiency and stability in the image distribution process through a new image distribution method.

In order to solve the above technical problems, embodiments of the present application provide an image distribution method, including: obtaining a distribution request of an image file; identifying a storage location of the image file in a source image repository of the image file; and distributing the image file to a target image repository according to the storage location of the image file.

Embodiments of the present application further provide a server, including: at least one processor; and a memory communicated with the at least one processor. The memory stores instructions executable by the at least one processor, and the instructions are executed by the at least one processor, to cause the at least one processor to execute the image distribution method as described above.

Embodiments of the present application further provide a computer-readable storage medium, a computer program is stored in the computer-readable storage medium, and when the computer program is executed by a processor, the image distribution method as described above is implemented.

BRIEF DESCRIPTION OF THE DRAWINGS

One or more embodiments are exemplified by pictures in the accompanying drawings, and these exemplifications are not intended to limit the embodiments.

DETAILED DESCRIPTION OF THE EMBODIMENTS

In order to make the objectives, technical solutions and advantages of the embodiments of the present application clearer, each embodiment of the present application will be described in detail below with reference to the accompanying drawings. However, those of ordinary skill in the art can understand that, in each embodiment of the present application, many technical details are provided for the reader to better understand the present application. However, even without these technical details and various changes and modifications based on the following embodiments, the technical solutions claimed in the present application can be realized. The following divisions of the various embodiments are for the convenience of description, and should not constitute any limitation on the specific implementation of the present application, and the various embodiments may be combined with each other and referred to each other on the premise of not contradicting each other.

A first embodiment of the present application relates to an image distribution method, including: obtaining a distribution request of an image file; identifying a first storage location of each layer data of the image file in a source image repository; and distributing each layer data of the image file from the source image repository to a target image repository according to the first storage location. When the image distribution is required, the storage location of each layer data of the image file is identified and then the image distribution is performed. Therefore, the image file does not need to be pulled locally and then pushed to the target image repository, which not only significantly improves the distribution efficiency of the image file, but also avoids that after pulling image files to the local, file conflicts may occur, thereby improving the stability in the image distribution process.

In this embodiment, the implementation details of the electronic seal application method are described in the following. The following content is only for the convenience of understanding, and is not necessary for the implementing the technical solution.

Figure 1:
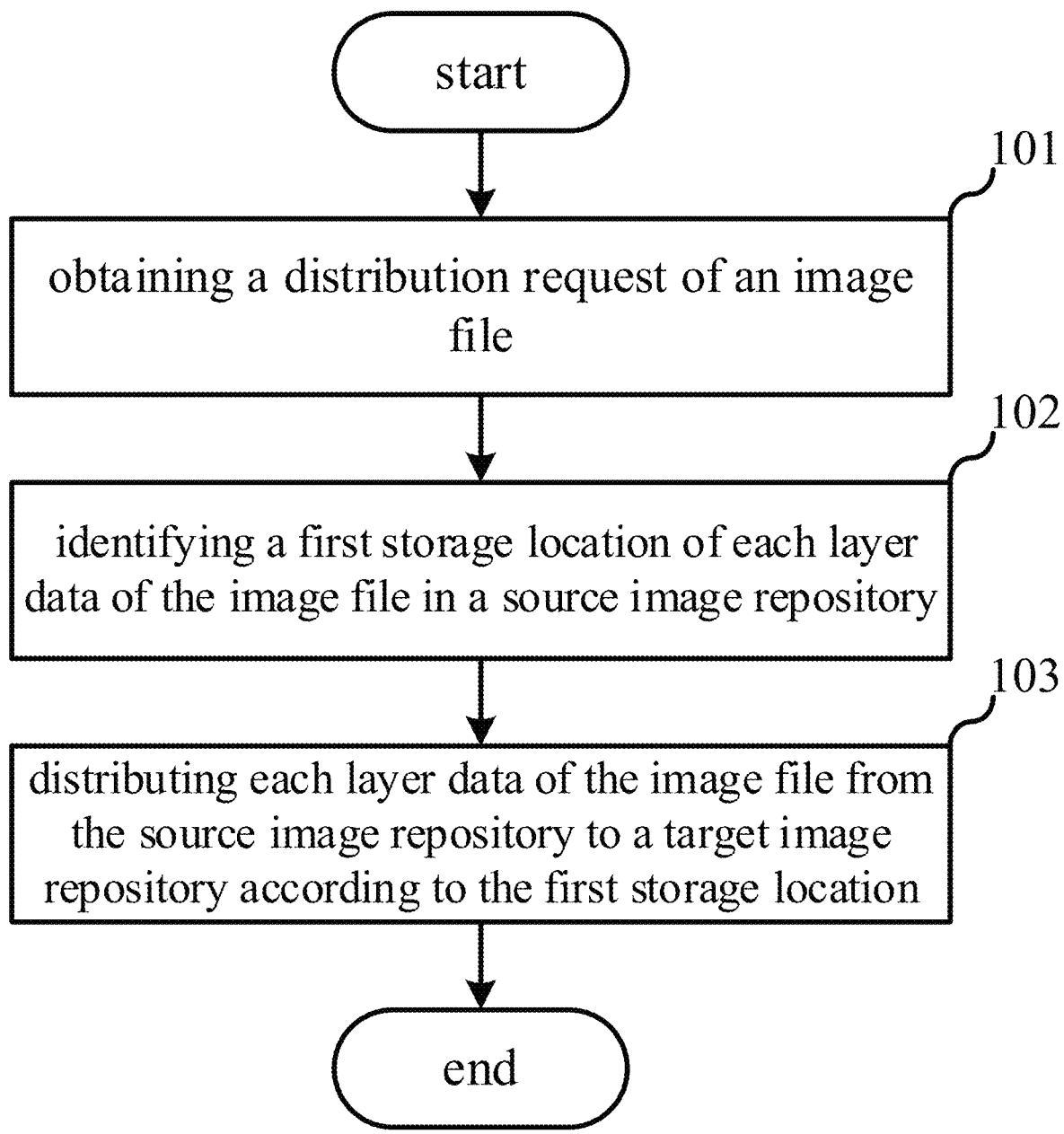
FIG. 1 is a flowchart of an image distribution method according to a first embodiment of the present application.

The specific process of this embodiment is shown in FIG. 1, and specifically includes the following operations.

Operation 101, obtaining a distribution request of an image file.

Specifically, the image file described in this embodiment is the image file requested in the distribution request, that is, the image file to be distributed. When a user needs to distribute images between multiple image repositories, the distribution request of image files is sent to an image distribute server (IDServer, a server of the image distribution system) through an image distribute client (IDClient, a client of the image distribution system). The available IDClient includes: a web client (Web), a mobile terminal application (App), a command line binary program, a command line script, or the like. In this embodiment, the execution subject is the IDServer, which can be deployed with IDClient on a same virtual node or a same virtual machine node to manage and control the image repository. The image distribution request carries at least the name of the image file to be distributed or an image list including the names of multiple image files to be distributed, the address of the source image repository and the address of the target image repository.

Operation 102, identifying a first storage location of each layer data of the image file in a source image repository.

Specifically, after receiving the distribution request of the image file from the IDServer, the image is identified in the source image repository. That is, parsing the image file name and the address of the source image repository in the distribution request. In addition, combined with the special storage structure of the image in the image repository, the storage location of each layer data of the image file to be distributed in the source image repository, namely the first storage location, is identified in the image repository. Each layer data of the image file, that is, the underlying data, is determined by the special storage structure of the image file in the image repository. The underlying data includes, but is not limited to, repositories, blobs, layers, manifests, or the like. Repositories are used to store the basic information of the image, including tenants, tags, links, or the like. Blobs are used to store actual data at each layer of the image, and layers are used to store the links between a certain image and the actual data layer. Manifests are used to store a tag of a certain image and the links between each tag and the actual data layer. After identifying the underlying data of the image file in the source image repository, locking the underlying data of the image file, that is, storing the underlying data.

In an embodiment, the preservation of the underlying data can be temporary. For example, the underlying data is written into the random access memory (RAM) of the server, that is, the volatile memory. After finishing the image distribution operation, the memory space occupied by the underlying data can be released. In addition, the preservation of the underlying data can further be persistent. For example, the underlying data is wrote in the non-volatile storage, such as the database, the local disk of the server, and the cloud storage space, or the like, which makes it unnecessary to identify the storage location of the image file again in the subsequent verification process of the image file or other distribution operations on the image file, thereby improving the distribution efficiency of image file.

Operation 103, distributing each layer data of the image file from the source image repository to a target image repository according to the first storage location.

Specifically, when distributing image files, the file data distributed to the target image repository is still consistent with the specific structure of the image storage. That is, the storage structure of the image files distributed to the target image repository is consistent with the storage structure of the image files in the source image repository, and the underlying data of the image files distributed to the target image repository is also consistent with the underlying data of the image files in the source image repository.

In the first embodiment, the present application provides an image distribution method, including: obtaining a distribution request of an image file; identifying a first storage location of each layer data of the image file in a source image repository; and distributing each layer data of the image file from the source image repository to the target image repository according to the first storage location. When the image distribution is required, the storage location of each layer data of the image file is identified and then the image distribution is performed. Therefore, the image file does not need to be pulled locally and then pushed to the target image repository. In this way, the processing efficiency of the image distribution system server for the distribution request is significantly improved when multiple image distribution request tasks are performed simultaneously, and file conflicts that may occur after pulling image files to the local can be avoided, thereby improving the stability in the image distribution process.

A second embodiment of the present application relates to an image distribution method. The second embodiment is substantially the same as the first embodiment. In this embodiment, before the distributing each layer data of the image file from the source image repository to the target image repository further includes identifying whether no image file identical to the image file to be distributed exists in the target image repository. If the identification result is yes, executing the distributing each layer data of the image file from the source image repository to the target image repository. Otherwise, not executing the distribution operation of the image file. By verifying the image files in the target image repository, unnecessary data transmission operations are avoided during the image distribution process.

Figure 2:
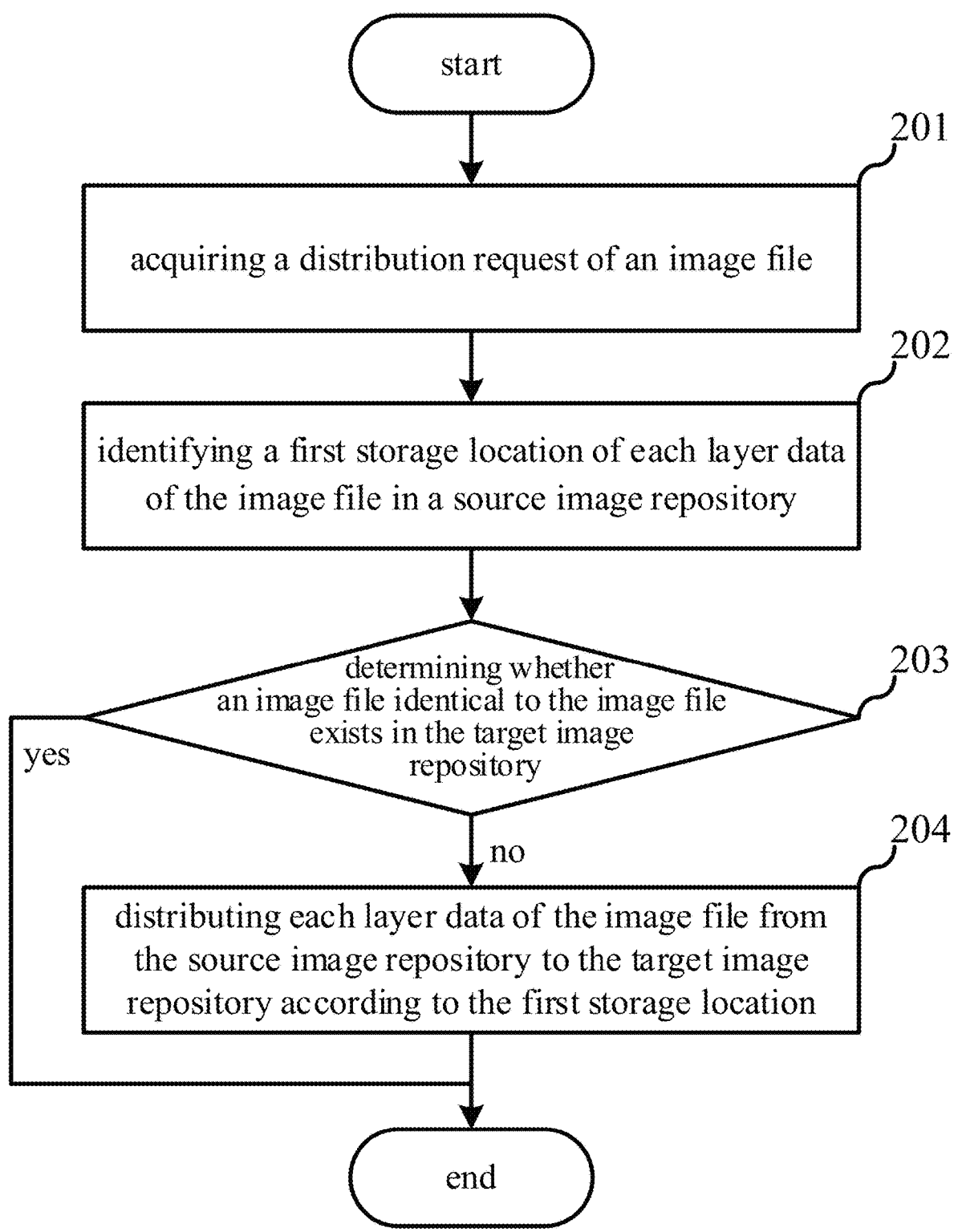
FIG. 2 is a flowchart of the image distribution method according to a second embodiment of the present application.

In this embodiment, the specific flowchart of the electronic seal application method is shown in FIG. 2, which specifically includes the following operations.

Operation 201, acquiring a distribution request of an image file.

Operation 202, identifying a first storage location of each layer data of the image file in a source image repository.

In this embodiment, operation 201 and operation 202 are the same as operation 101 and operation 102 of the first embodiment of the present application, and relevant implementation details have been specifically described in the first embodiment, which will not be repeated here.

Operation 203, determining whether an image file identical to the image file exists in the target image repository. In response that no image file identical to the image file exists in the target image repository, executing operation 204, distributing each layer data of the image file from the source image repository to the target image repository according to the first storage location. Otherwise, ending the image distribution process.

When an image file identical to the image file to be distributed exists in the target image repository, it means that the image file requested by the user already exists in the image repository. Therefore, the image distribution operation is unnecessary. In this way, not only the transmission resource in the virtual machine environment can be saved, but also the bandwidth occupation can be reduced. Thus, the image distribution speed is further increased, and when multiple image distribution request tasks are performed simultaneously, the processing efficiency of the image distribution system server for distribution requests is significantly improved.

In an embodiment, the method of determining that no image file identical to the image file exists in the target image repository is described as follows.

Firstly, retrieving the image name of the image file to be distributed in the target image repository, that is, identifying whether an image file with a same name as the image file to be distributed exists in the target image repository. When no image file with the same name as the image file exists in the target image repository, determining that no image file identical to the image file to be distributed exists in the target image repository. At this time, executing the distributing each layer data of the image file from the source image repository to the target image repository according to the first storage location.

When an image file with the same name as the image file exists in the target image repository, the storage location of each layer data of the image file with the same name as the image file in the target image repository, namely the second storage location, is further identified. Then comparing each layer data respectively stored in the first storage location and the second storage location. If each layer data stored in the second storage location does not match with each layer data stored in the first storage location, determining that no image file identical to the image file to be distributed exists in the target image repository. At this time, executing the distributing each layer data of the image file from the source image repository to the target image repository according to the first storage location. Otherwise, finally determining the image file identical to the image file to be distributed in the target image repository, and ending the image distribution process.

In this embodiment, the file characteristics of the image file are obtained from each layer data of the image file. When the file characteristics of the image file with the same name as the image file to be distributed in the target image repository are consistent with the file characteristics of the image file to be distributed, determining the image file with the same name as the image file to be distributed and the image file to be distributed are the same image files. The file characteristics compared here include, but are not limited to, the data bulk, the size, the md5 code, the sha256 code, or the like of the image file. When a difference exists in any one of the file characteristics, determining the image file with the same name as the image file to be distributed and the image file to be distributed are different image files.

In an embodiment, the specific operation of the distributing each layer data of the image file from the source image repository to a target image repository according to the first storage location can be in the following manner. Replicating each layer data of the image file to be distributed from the first storage location, and storing each layer replicated data of the image file in the second storage location in an overwriting manner. When the image is distributed in this way, the data distributed to the target image repository still automatically conforms to the specific structure of the image storage.

Therefore, this embodiment provides an image distribution method, including: before the image distribution, identifying the image file with the same name as the image file to be distributed in the target image repository. The image distribution operation is not performed when an image file identical to the image file to be distributed exists in the target image repository. In this way, not only the bandwidth occupied by the data transmission can be reduced to make the processing efficiency significantly improved when multiple image distribution request tasks are performed, but also the file conflicts of the same image files in the target image repository can be avoided after the distribution is finished.

In addition, those skilled in the art can understand that the step division for the various methods above is only for clear descriptions. The steps can be combined into one step or a certain step can be split into multiple steps when the various methods described above are implemented, which all falls in the scope claimed in the present application as long as the same logical relationship is included. Adding insignificant modifications or introducing insignificant designs to the algorithm or the process, but not changing the core design of the algorithm and the process of the present application are all within the present application.

A third embodiment of the present application relates to an image distribution method, and the third embodiment is substantially the same as the first embodiment. In this embodiment, after the distributing each layer data of the image file from the source image repository to the target image repository, verifying the first storage location and the third storage location of each layer data of a distributed image file. If the first storage location matches with the third storage location, the image is distributed successfully, and then ending the image distribution process. If the first storage location does not match with the third storage location, it means that an error occurred in the distribution process of the image file, and then re-executing the distributing each layer data of the image file from the source image repository to the target image repository according to the first storage location. In this embodiment, the distributed files are verified, which ensures the distribution accuracy of the image file and further improves the stability in the image distribution process.

Figure 3:
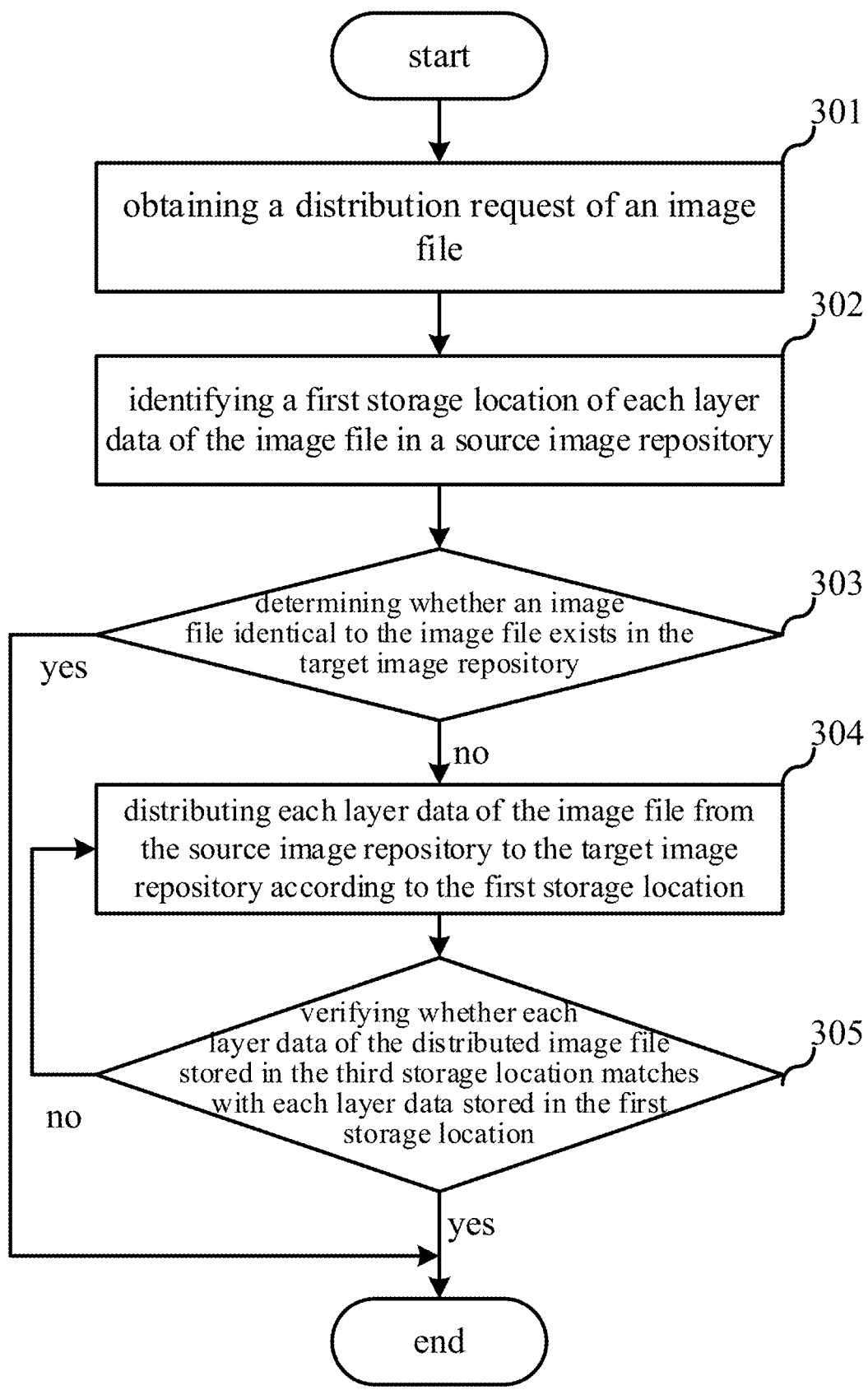
FIG. 3 is a flowchart of the image distribution method according to a third embodiment of the present application.

The specific flowchart of the image distribution method in this embodiment is shown in FIG. 3, and includes the following operations.

Operation 301, obtaining a distribution request of an image file.

Operation 302, identifying a first storage location of each layer data of the image file in a source image repository.

Operation 303, determining whether an image file identical to the image file exists in the target image repository. If no image file identical to the image file exists in the target image repository, executing operation 304, distributing each layer data of the image file from the source image repository to the target image repository according to the first storage location. Otherwise, ending the image distribution process.

In this embodiment, operations 301 to 304 are substantially the same as operations 201 to 204 of the second embodiment, and relevant implementation details have been specifically described in the second embodiment, which will not be repeated here.

Operation 305, verifying whether each layer data of the distributed image file stored in the third storage location matches with each layer data stored in the first storage location. If each layer data stored in the third storage location does not match with each layer data stored in the first storage location, ending the image distribution process. Otherwise, re-executing operation 304, distributing each layer data of the image file from the source image repository to the target image repository according to the first storage location.

After finishing the image file distribution, identifying a third storage location of each layer data of a distributed image file in the target image repository, then verifying whether each layer data stored in the third storage location matches with each layer data stored in the first storage location. If each layer data stored in the third storage location does not match with each layer data stored in the first storage location, re-executing operation 304. The stored data of the distributed image file is verified, which ensures that no loss or error in the data of the distributed image file, thereby further improving the stability of the image file in the image distribution process.

In this embodiment, the verification process of each layer data of the image file is similar to the verification process in the second embodiment, which is to compare the file characteristics of two image files, such as the data bulk, the size, the md5 code, the sha256 code, or the like. When a difference exists in any file characteristic between the distributed image file in the target image repository and the image file in the source image repository, it means that the stored data of the distributed image file in the target image repository does match with the stored data of the image file in the source image repository.

In addition, users can set the maximum number of redistributed images in the image distribution system server. Errors occurring in image distribution process for many times may be caused by a system problem, and the error message will be sent to the administrator for the administrator to verify whether other errors exists in the system, thereby preventing the image distribution process from falling into an error loop and wasting system resources.

In an embodiment, when the storage address information of the image file needs to be stored persistently, after identifying the first storage location of each layer data of the image file in the source image repository and the second storage location of each layer data of the image file with the same name as the image file in the target image repository, the first storage location and the second storage location can be respectively wrote in the non-volatile memory, such as the database, the local disk in the server, the cloud storage space, or the like.

In this embodiment, when operation 304 is re-executed after operation 305 and verification, first, obtaining a stored first storage location from the non-volatile memory. In addition to directly identifying the third storage location of the distributed image file in the target image repository, further obtaining the previously stored second storage location from the non-volatile memory. Then verifying whether each layer data stored in the first storage location matches with each layer data stored in the second storage location or in the second storage location, to finish the verification process of the distributed image file. If each layer data stored in the first storage location is consistent with each layer data stored in the second storage location or in the second storage location, ending the data distribution process. Otherwise, re-executing operation 304 again.

Therefore, this embodiment provides an image distribution method. After finishing the image distribution, verifying whether each layer data of a distributed image file in the target image repository is consistent with each layer data of the image file in the source image repository to ensure the distribution accuracy of the image file, thereby further improving the stability in the image distribution process.

Figure 4:
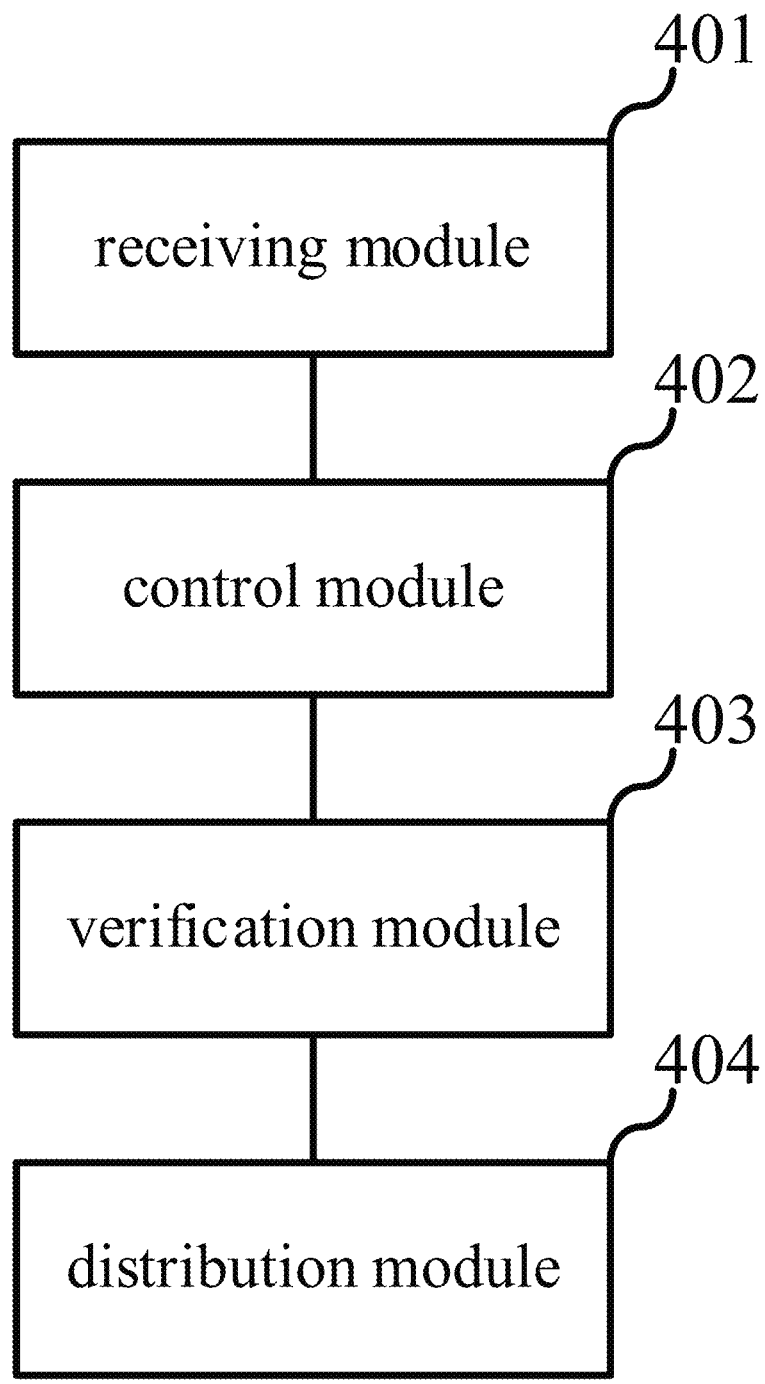
FIG. 4 is a schematic structural diagram of an image distribution device according to a fourth embodiment of the present application.

A fourth embodiment of the present application provides an image distribution device shown in FIG. 4. The image distribution device includes a receiving module 401, a control module 402, a verification module 403, and a distribution module 404.

The receiving module 401 is configured to obtain a distribution request of an image file, and send the image name to the control module after the image name is parsed.

The control module 402 is configured to identify a first storage location of each layer data of the image file to be distributed in the source image repository.

In an embodiment, the control module 402 is further configured to identify a second storage location of each layer data of the image file with the same name as the file image to be distributed in the target image repository.

In an embodiment, the control module 402 is further configured to identify a third storage location of each layer data of a distributed image file in the target image repository.

In an embodiment, after identifying the first storage location of each layer data of the image file in the source image repository and the second storage location of each layer data of the image file with the same name as the image file in the target image repository, the control module 402 is further configured to write the first storage location and the second storage location in the non-volatile memory, such as the database, the local disk in the server, the cloud storage space, or the like.

The verification module 403 is configured to determine that no image file identical to the image file exists in the target image repository according to the first storage location and the second storage location identified by the control module 402. The verification module 403 is further configured to send the verification result to the distribution module 404.

In an embodiment, the verification module 403 is further configured to obtain the first storage location and/or the second storage location from the non-volatile memory.

In an embodiment, the verification module 403 is further configured to verify whether the third storage location of each layer data of the distributed image file matches with the first storage location, and send the verification result to the distribution module 404.

The distribution module 404 is configured to distribute each layer data of the image file from the source image repository to the target image repository according to the first storage location and the verification result sent by the verification module 403.

Figure 5:
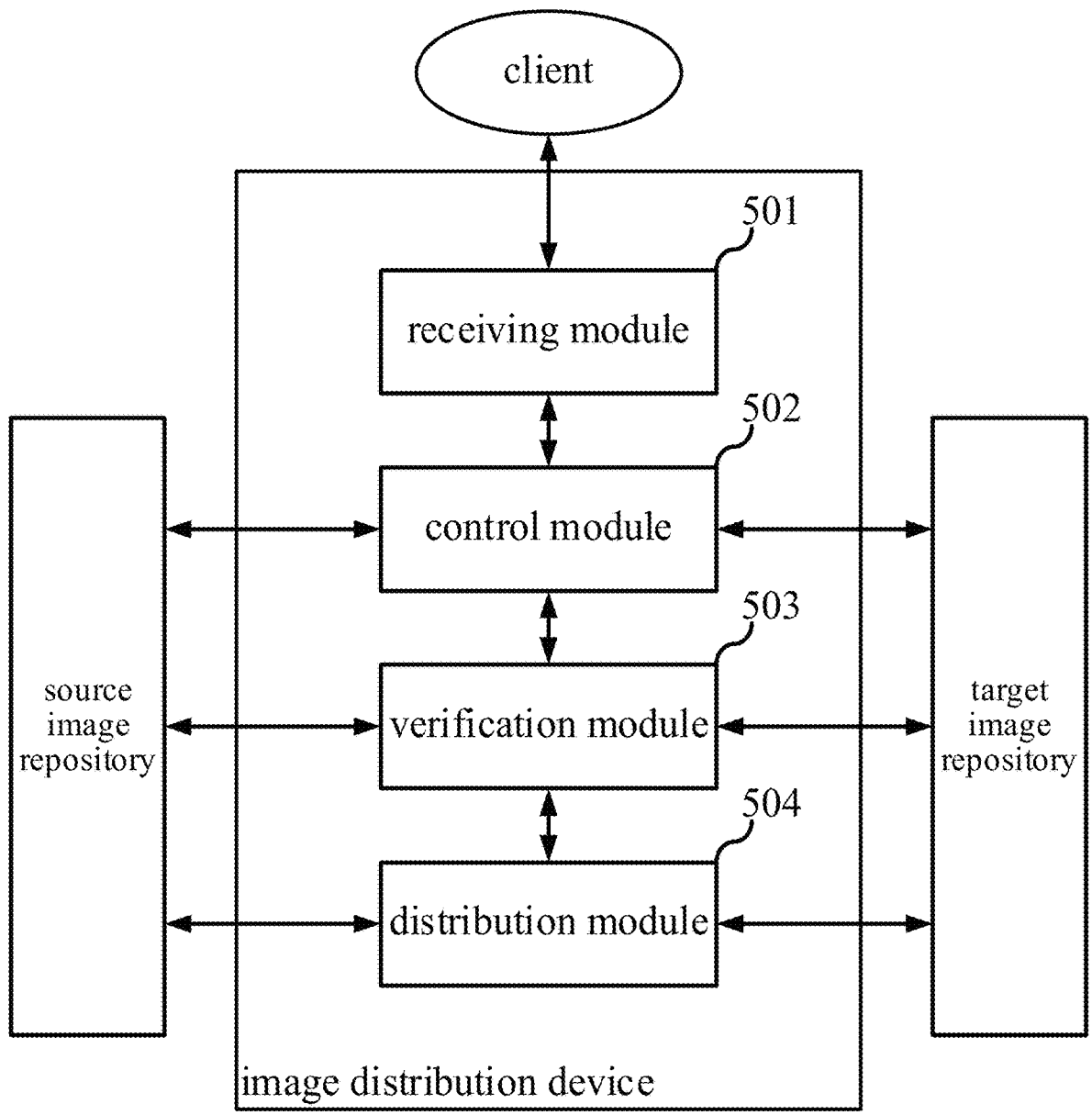
FIG. 5 is another schematic structural diagram of the image distribution device according to the fourth embodiment of the present application.

In specific applications, the structure and the interaction relationship of the distribution device in this embodiment is shown in FIG. 5. The receiving module 501 is connected to the client, and is configured to receive the image distribution request sent by the user through the client.

The control module 502, the verification module 503, and the distribution module 504 are all communicated with the source image repository and the target image repository synchronously.

It is not difficult to find that this embodiment relates to a device corresponding to the first, second or third embodiment, and this embodiment can be implemented in cooperation with the first or second embodiment. The relevant technical details described in the first, second or third embodiment can be applied in this embodiment, which will not be repeated here to reduce repetition. Correspondingly, the relevant technical details described in this embodiment can also be applied in the first, second or third embodiment.

It should be noted that, each module involved in this embodiment is a logical module. In practical applications, a logical unit can be a physical unit, or a part of a physical unit, or can be implemented as a combination of multiple physical units. In addition, to highlight the innovative part of the present application, units not closely related to solving the technical problem provided in the present application are not introduced in this embodiment, but it does not mean that no other units exists in this embodiment.

Figure 6:
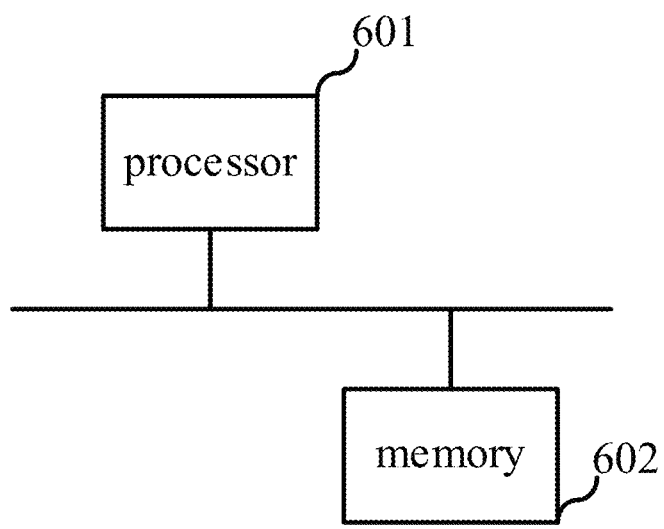
FIG. 6 is a schematic structural diagram of a server according to a fifth embodiment of the present application.

A fifth embodiment of the present application relates to a server shown in FIG. 6, including: at least one processor 601; and a memory 602 communicated with the at least one processor 601, the memory 602 stores instructions executable by the at least one processor 601, and the instructions are executed by the at least one processor 601, to cause the at least one processor 601 to execute the electronic seal application method as described above.

The memory and the processor are connected by a bus. The bus may include any number of interconnected buses and bridges that connect together the various circuits of one or more processors and memory. The bus may also connect together various other circuits, such as peripherals, voltage regulators, and power management circuits, which are well known in the art and therefore will not be described further herein. The bus interface provides the interface between the bus and the transceiver. A transceiver may be a single element or multiple elements, such as multiple receivers and transmitters, providing a unit for communicating with various other devices over a transmission medium. The data processed by the processor is transmitted on the wireless medium through the antenna. In this embodiment, the antenna also receives the data and transmits the data to the processor.

The processor is responsible for managing the bus and general processing, and may also provide various functions including timing, peripheral interface, voltage regulation, power management, and other control functions. The memory may store data used by the processor when performing operations.

A sixth embodiment of the present application relates to a computer-readable storage medium storing a computer program. When the computer program is executed by the processor, the above method embodiment is realized.

Those skilled in the art can understand that all or part of the operations in the method of the above embodiments can be finished by instructing the relevant hardware through a program. The program is stored in a storage medium, and includes several instructions to cause a device (which may be a single-chip microcomputer, a chip, or the like) or a processor to execute all or part of the operations of the methods described in the various embodiments of the present application. The aforementioned storage medium includes: U disk, removable hard disk, read-only memory (ROM), random access memory (RAM), magnetic disk or optical disk and other media that can store program codes.

Those of ordinary skill in the art can understand that the above-mentioned embodiments are specific embodiments for realizing the present application. However, in practical application, various changes in form and details may be made therein without departing from the spirit and scope of the present application.

What is claimed is:

1. An image distribution method, comprising:
   obtaining a distribution request of an image file;
   identifying a plurality of first storage locations of each respective layer data of the image file in a source image repository;
   distributing each layer data of the image file from the source image repository to a target image repository according to the plurality of first storage locations;
   before the distributing each layer data of the image file from the source image repository to the target image repository according to the plurality of first storage locations, the image distribution method further comprises:
   determining that no image file identical to the image file exists in the target image repository,
   wherein after the distributing each layer data of the image file from the source image repository to the target image repository according to the plurality of first storage locations, the image distribution method further comprises:
   identifying a plurality of third storage locations of each respective layer data of a distributed image file in the target image repository; and
   in response to verifying that each layer data stored in the plurality of third storage locations does not match each layer data stored in the plurality of first storage locations, re-executing the distributing each layer data of the image file from the source image repository to the target image repository according to the plurality of first storage locations.

2. The image distribution method of claim 1, wherein the distributing each layer data of the image file from the source image repository to the target image repository according to the plurality of first storage locations comprises:
   replicating each layer data of the image file from the plurality of first storage locations, and storing each layer replicated data of the image file in the target image repository.

3. The image distribution method of claim 1, wherein the determining that no image file identical to the image file exists in the target image repository comprises:
   identifying whether an image file with a same name as the image file exists in the target image repository; and
   in response that no image file with a same name as the image file exists in the target image repository, determining that no image file identical to the image file exists in the target image repository.

4. The image distribution method of claim 3, wherein the determining that no image file identical to the image file exists in the target image repository further comprises:
   in response that an image file with a same name as the image file exists in the target image repository, identifying a plurality of second storage locations of each respective layer data of the image file with the same name as the image file in the target image repository; and
   in response that each layer data stored in the plurality of second storage locations does not match with each layer data stored in the plurality of first storage locations, determining that no image file identical to the image file exists in the target image repository.

5. The image distribution method of claim 1, wherein after the identifying the plurality of first storage locations of each respective layer data of the image file in the source image repository, the image distribution method further comprises writing the plurality of first storage locations in a non-volatile memory, wherein in the re-executing the distributing each layer data of the image file from the source image repository to the target image repository according to the plurality of first storage locations, the first storage location is obtained from the non-volatile memory.

6. The image distribution method of claim 4, wherein the distributing each layer data of the image file from the source image repository to a target image repository according to the plurality of first storage locations comprises:

replicating each layer data of the image file from the plurality of first storage locations; and storing each layer replicated data of the image file in the plurality of second storage locations in an overwriting manner.

7. The image distribution method of claim 6, wherein after the identifying the plurality of second storage locations of each layer data of the image file with the same name as the image file in the target image repository, the image distribution method further comprises:

writing the plurality of second storage locations in a non-volatile memory;

after the distributing each layer data of the image file from the source image repository to the target image repository according to the plurality of first storage locations, the image distribution method further comprises:

obtaining the plurality of second storage locations from the non-volatile memory; and in response to verifying that each layer data stored in the plurality of second storage locations does not match with each layer data stored in the plurality of first storage locations, re-executing the distributing each layer data of the image file from the source image repository to the target image repository according to the plurality of first storage locations.

8. A server, comprising:

at least one processor; and a memory communicated with the at least one processor, wherein the memory stores instructions executable by the at least one processor, and the instructions are executed by the at least one processor, to cause the at least one processor to execute the image distribution method of claim 1.

9. A non-transitory computer-readable storage medium, wherein a computer program is stored in the non-transitory computer-readable storage medium, and when the computer program is executed by a processor, the image distribution method of claim 1 is implemented.

\* \* \* \* \*